United States Patent
Li

(10) Patent No.: US 9,315,144 B2
(45) Date of Patent: Apr. 19, 2016

(54) LAMP FOR INSTALLING ON THE ROOF OF A VEHICLE HAVING A SEAT AND A MAIN BODY PIVOTABLE ABOUT A FIRST AXIS AND A LAMP MEMBER PIVOTABLE ABOUT A SECOND AXIS

(71) Applicant: Jing Jyun Industry Co., Ltd., Changhua (TW)

(72) Inventor: Shu-Ju Li, Changhua (TW)

(73) Assignee: JING JYUN INDUSTRY CO., LTD., Changhua, Changhua County (TW)

( * ) Notice: Subject to any disclaimer, the term of this patent is extended or adjusted under 35 U.S.C. 154(b) by 109 days.

(21) Appl. No.: 14/251,808

(22) Filed: Apr. 14, 2014

(65) Prior Publication Data

US 2014/0307460 A1  Oct. 16, 2014

(30) Foreign Application Priority Data

Apr. 16, 2013  (TW) .............................. 102206876 U

(51) Int. Cl.
   *B60Q 1/24*     (2006.01)
   *B60Q 1/26*     (2006.01)
   *F21V 21/28*    (2006.01)
   *F21V 21/30*    (2006.01)

(52) U.S. Cl.
   CPC ............... *B60Q 1/24* (2013.01); *B60Q 1/2615* (2013.01); *F21V 21/28* (2013.01); *F21V 21/30* (2013.01)

(58) Field of Classification Search
   CPC ........ B60Q 1/24; B60Q 1/245; B60Q 1/2615; F21V 21/30; F21V 21/28; F21V 21/0808; F21V 21/14
   See application file for complete search history.

(56) References Cited

U.S. PATENT DOCUMENTS

| | | | | |
|---|---|---|---|---|
| 7,850,363 | B1 * | 12/2010 | Speidel .................. | F21V 21/30 362/648 |
| 2008/0123359 | A1 * | 5/2008 | Larochelle ........... | B60Q 1/2696 362/501 |
| 2014/0204218 | A1 * | 7/2014 | Gebhard ................ | B60Q 1/245 348/164 |

* cited by examiner

*Primary Examiner* — Robert May

(57) ABSTRACT

A lamp adapted for being installed on a roof of a vehicle includes a seat, a main body, and a lamp member. The seat is adapted for being installed on the roof of the vehicle and defines a first pivot axis. The main body has a first end and a second end. The first end is pivotally disposed on the seat so that the main body is pivotable around the first pivot axis. The second end of the main body defines a second pivot axis. The lamp member is pivotally disposed on the second end so as to be pivotable around the second pivot axis. The lamp member has a luminous device which is capable of emitting light. The first pivot axis is non-parallel to the second pivot axis. As a result, both angle and direction of the lamp member can be adjusted.

7 Claims, 4 Drawing Sheets

US 9,315,144 B2

LAMP FOR INSTALLING ON THE ROOF OF A VEHICLE HAVING A SEAT AND A MAIN BODY PIVOTABLE ABOUT A FIRST AXIS AND A LAMP MEMBER PIVOTABLE ABOUT A SECOND AXIS

BACKGROUND OF THE INVENTION

1. Field of the Invention

The present invention relates to a lamp, more especially to a lamp on a roof of vehicle.

2. Description of the Prior Art

In general, the main lamp of vehicle is installed in front of the vehicle to illuminate the pavement for safety. However, the main light can only illuminate the pavement in front of the vehicle.

A lamp disclosed in patent TW M382928 shows a frame disposed on the license plate, and luminous devices are received in the frame to increase illuminating area and light intensity.

However, angle or orientation of this lamp is stilled unable to be adjusted. As a result, the lamp can not be used to illuminate the periphery of the vehicle when a user is repairing or replacing the tires.

SUMMARY OF THE INVENTION

The main object of the present invention is to provide a lamp installed on cars wherein angle and direction of the lamp can be adjusted.

To achieve the above and other objects, a lamp of the present invention includes a seat, a main body, and a lamp member.

The seat is adapted for being installed on the roof of the vehicle. The seat defines a first pivot axis substantially perpendicular to the roof of the vehicle.

The main body has a first end and an opposite second end. The main body is pivotally disposed on the seat with the first end thereof so as to be pivotable with respect to the seat around the first pivot axis. A second pivot axis is defined at the second end of the main body. The first pivot axis is non-parallel to the second pivot axis The lamp member is pivotally disposed on the second end of the main body so as to be pivotable with respect to the main body. The lamp member includes a luminous device which is able to emit light.

Thereby, due to the pivot between the main body and the seat and the pivot between the lamp member and the main body, both angle and direction of the luminous device can be adjusted. Thus, a multi-function lamp is provided.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
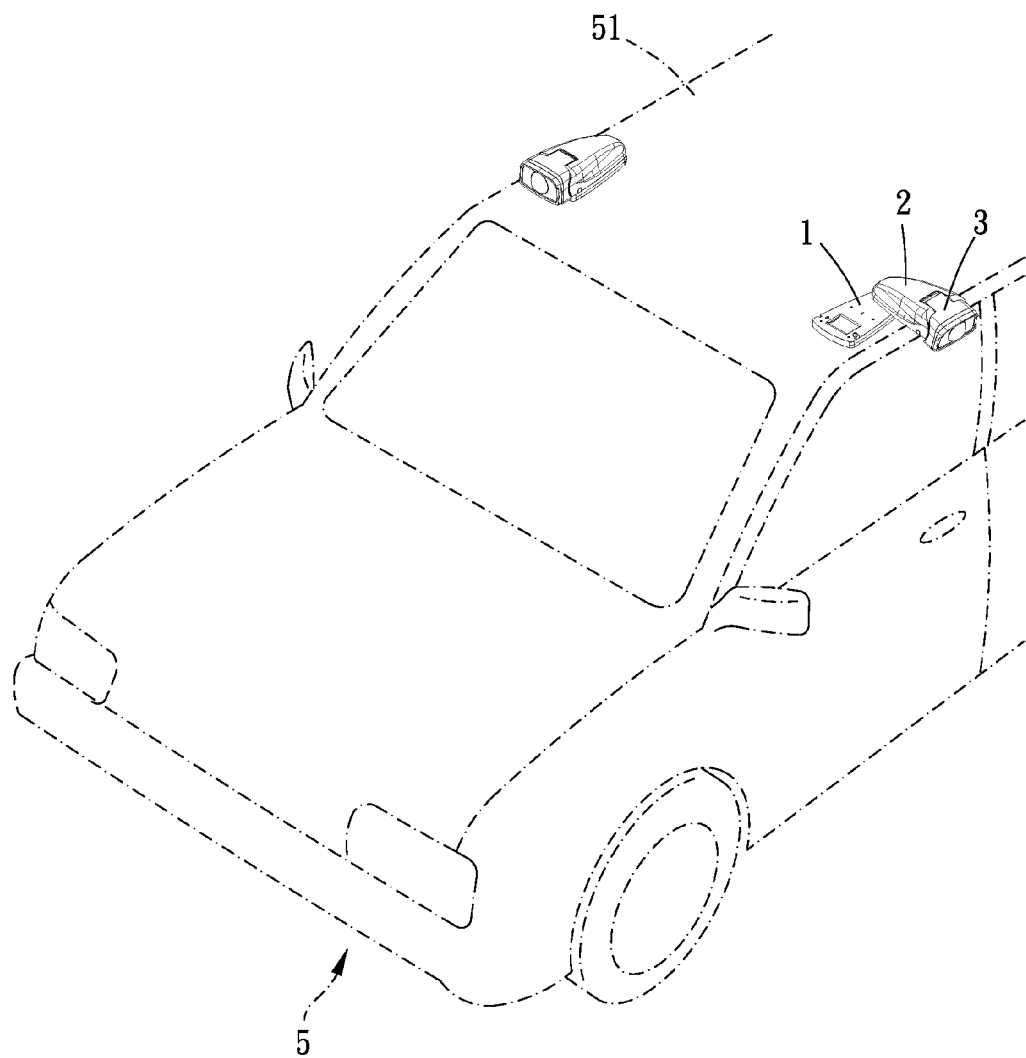
FIG. 1 is an illustration of the present invention showing a lamp installed on a roof of a vehicle.
Figures 2, 2A:
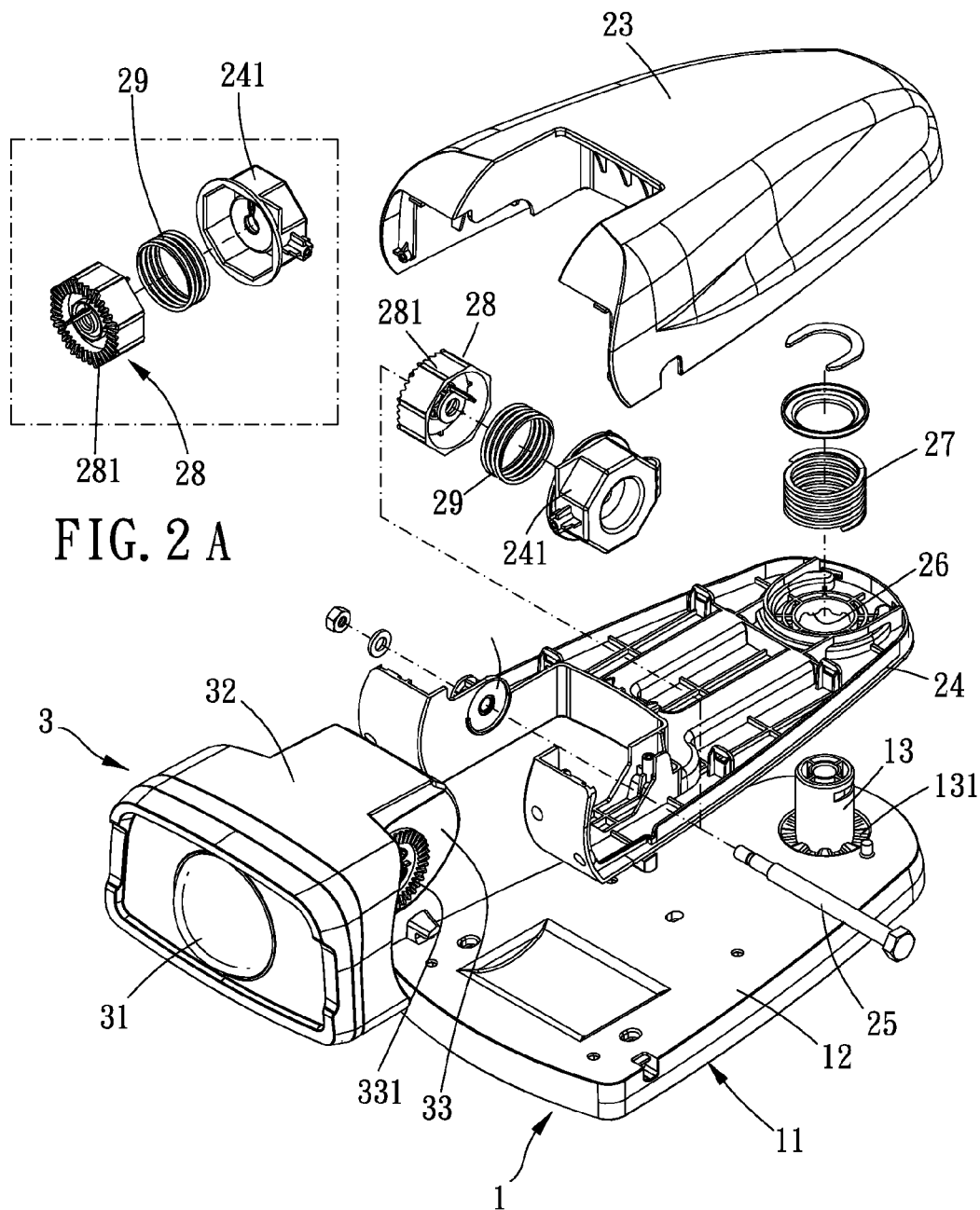
FIG. 2 is a breakdown drawing of the present invention.
FIG. 2A is a partial breakdown drawing of the present invention.
Figure 3:
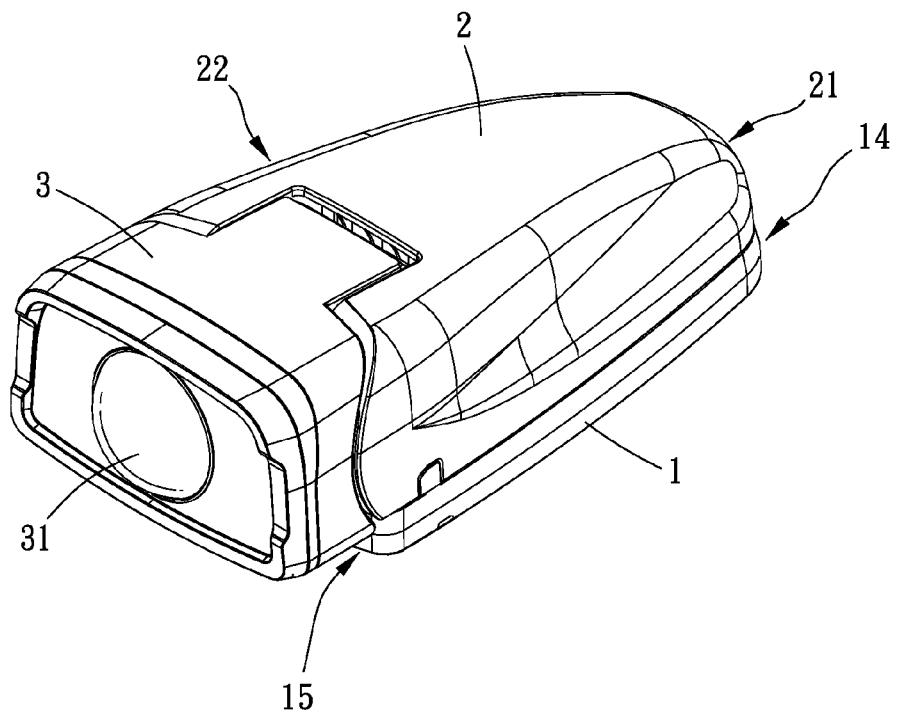
FIG. 3 is a stereogram of the present invention.

Please refer to FIG. 1 to FIG. 5 and FIG. 2A, the lamp of the present invention is adapted for being installed on a roof 51 of a vehicle 5. The lamp of the present invention includes a seat 1, a main body 2, and a lamp member 3.

The seat 1 is plate-shaped and has a first face 11 and an opposite second face 12. The first face 11 of the seat 1 is adapted for being positioned on the roof of the vehicle. Preferably, the seat 1 is installed on a portion of the roof 51 near the doors of the vehicle, and the first face 11 has an adhesive layer or magnet for adhering onto the roof 51. In addition, the plate-shaped seat 1 increases contact area to the roof 51 to adhere onto the roof 51 more firmly. Besides, the seat 1 defines a first pivot axis perpendicular to the roof 51. In the present embodiment, to fit the roof 51, the first face 11 has a slightly cambered surface, and the first pivot axis is substantially perpendicular to the roof 51.

The main body 2 has a first end 21 and a second end 22. The first end 21 of the main body 2 is pivotally disposed on the second face 12 of the seat 1 so that the main body 2 is pivotable with respect to the seat 1 around the first pivot axis. As a result, the main body 2 is able to pivot on a plane parallel to the roof 51 so that the orientation of the main body can be adjusted. More specifically, the seat 1 includes a first pivot element 13 connecting the main body 2 and the seat 1. The first pivot element 13 has a first toothed portion 131 facing the main body 2, and the main body 2 has a second toothed portion 26 facing the seat 1. The first toothed portion 131 is selectively engaged with the second toothed portion 26 so as to restrict free pivoting of the main body 2 with respect to the seat 1. More specifically, the main body 2 includes a shell 23, a base plate 24, and a fixing element 25. The shell 23 is detachably disposed on the base plate 24. The second toothed portion 26 is formed on a face of the base plate 24 facing the seat 1. The main body 2 further includes a second pivot element 28 at the second end 21 thereof and defines a second pivot axis at the second end 21. Specifically, the base plate 24 is formed with two lateral walls 241,242 which are distant from each other in a predetermined distance. The second pivot element 28 is arranged between the two lateral walls 241,242. The fixing element 25 is inserted through one of the lateral wall 241 and the second pivot element 28 and is further screwed with the other lateral wall 242. Besides, the first pivot axis is not parallel to the second pivot axis. Preferably, the first pivot axis is perpendicular to the second pivot axis. The seat 1 has a third end 14 and an opposite fourth end 15, the first pivot axis passes through the third end 14, and the first end 21 of the main body 2 is pivoted to the third end 14. The seat 1 further has a lateral periphery 16 extending between the third end 14 and the fourth end 15, and there exists a distance from the first pivot axis to the second pivot axis which is greater than a distance from the first pivot axis to the lateral periphery 16 of the seat 1. As viewed along the first pivot axis, the second pivot axis is adjustably located outside the seat 1 and beyond the lateral periphery 16 of the seat 1 as the second end 22 of the main body 2 is swung away from the fourth end 15 of the seat 1.

The lamp member 3 is pivotally disposed on the second end 22 of the main body 2 so as to be pivotable with respect to the main body 2 around the second pivot axis. The lamp member 3 has a luminous device 31 and a cover 32. The luminous device 31 is partially received in the cover 32 and is able to emit light. The lamp member 3 further has a pivot portion 33 which is integrally formed on the lamp member 3. The pivot portion 33 is pivotally connected with the second pivot element 28. More specifically, the second pivot element 28 has a third toothed portion 281 at a side thereof facing the pivot portion 33. An elastic element 29 is arranged between the second pivot element 28 and one of the lateral walls 241. The pivot portion 33 has a fourth toothed portion 331 at a side facing the second pivot element 28. The third toothed portion 281 is selectively engaged with the fourth toothed portion 331. The elastic element 29 pushes the second pivot element 28 toward the pivot portion 33 so that the third toothed portion 281 tends to engaged with the fourth toothed portion 331. As a result, pivoting of the lamp member 3 with respect to the main body 2 is restricted.

Figure 4:
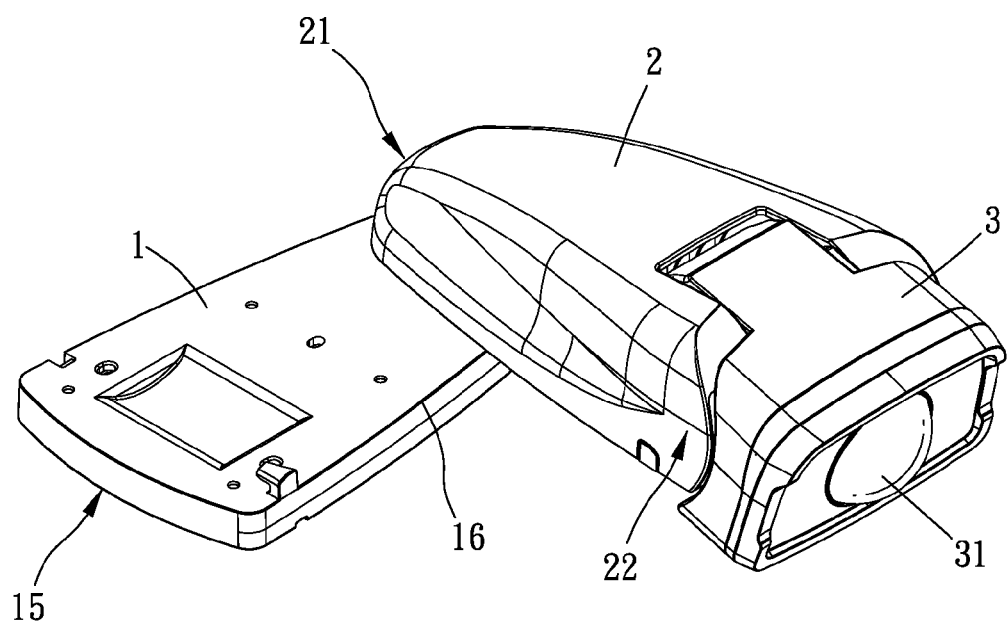
FIG. 4 is a stereogram of the present invention showing that a main body has pivoted.

In use, please refer to FIG. 1 to FIG. 5, the seat 1 is adhered onto the roof 51 of the vehicle 5. When main body 2 is pushed by a user, the main body 2 pivots with respect to the seat 1 around the first pivot axis so as to adjust the orientation of the light emitted by the luminous device 31, as shown in FIG. 4. When the main body 2 is pivoted outward, two sides of the vehicle 5 that the main light of the vehicle 5 is unable to light of can be lighted by the luminous device 31. In addition, due to the engagement between the first toothed portion and the second toothed portion, the adjustment of orientation is easy, and the main body 2 can be positioned immediately. On the other hand, the main body 2 is prevented from swaying with respect to the seat 1 due to the engagement between the first toothed portion and the second toothed portion when the vehicle is moving.

Figure 5:
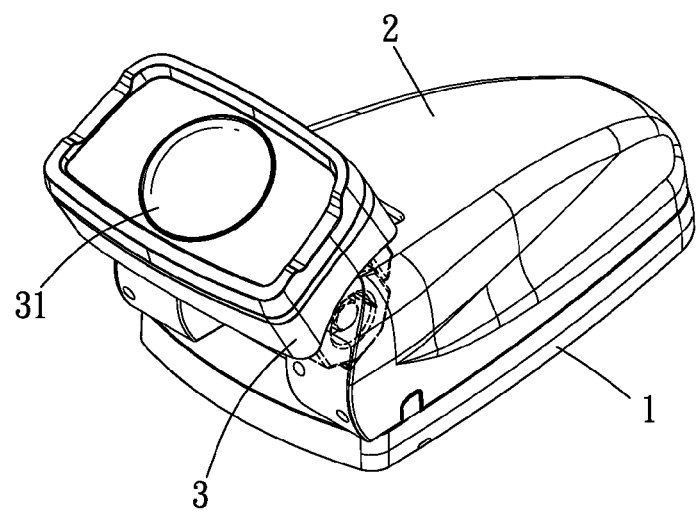
FIG. 5 is a stereogram of the present invention showing that a lamp member has pivoted.

Besides, the lamp member 3 is able to be pivoted with respect to the main body 2 around the second pivot axis, as shown in FIG. 5. Due to the engagement between the third toothed portion and the fourth toothed portion, the angle of the lamp member 3 can be easily adjusted. Thus, the lamp member 3 is able to face upward or downward. When the lamp member 3 faces downward, repairing of tires becomes easier. Also, the lamp member 3 can be used as a lighting device during camping. Optionally, the pivoting of the main body and the lamp member and the illumination mode of the illumination device can be adjusted and controlled by a remote controller.

What is claimed is:

1. A lamp, adapted for being installed on a roof of a vehicle, the lamp including:
    a seat, adapted for being installed on the roof of the vehicle, the seat defining a first pivot axis substantially perpendicular to the roof of the vehicle;
    a main body, having a first end and an opposite second end, the main body being pivotally disposed on the seat with the first end thereof so as to be pivotable with respect to the seat around the first pivot axis, a second pivot axis being defined at the second end of the main body;
    a lamp member, pivotally disposed on the second end of the main body so as to be pivotable with respect to the main body, the lamp member including a luminous device which is able to emit light;
    wherein the first pivot axis is non-parallel to the second pivot axis;
    wherein the seat has a third end and an opposite fourth end, the first pivot axis passes through the third end, the first end of the main body is pivoted to the third end;
    wherein the seat further has a lateral periphery extending between the third end and the fourth end, there exists a distance from the first pivot axis to the second pivot axis which is greater than a distance from the first pivot axis to the lateral periphery of the seat;
    wherein as viewed along the first pivot axis, the second pivot axis is adjustably located outside the seat and beyond the lateral periphery of the seat as the second end of the main body is swung away from the fourth end of the seat.

2. The lamp of claim 1, wherein the seat further includes a first pivot element connecting the main body and the seat together and has a first toothed portion facing the main body, the main body has a second toothed portion facing the seat, the first toothed portion is selectively engaged with the second toothed portion.

3. The lamp of claim 2, wherein the main body has a second pivot element at the second end thereof, the second pivot element has a third toothed portion, the lamp member has a pivot portion, the lamp member is pivotally disposed on the second pivot element with the pivot portion thereof, the pivot portion has a fourth toothed portion on a side thereof facing the second pivot element, the third toothed portion is selectively engaged with the fourth toothed portion, an elastic element is arranged between the second pivot element and the main body to push the second pivot element so that the third toothed portion tends to move toward the fourth toothed portion to engage with the fourth toothed portion.

4. The lamp of claim 3, wherein the main body includes a shell, a base plate, and a fixing element, the shell is detachably disposed on the base plate, the base plate is formed with two lateral walls which are distant from each other in a predetermined distance, the second pivot element is arranged between the two lateral walls, the fixing element is inserted through one of the lateral walls, the second pivot element, and the pivot portion and is further screwed to the other lateral wall, the elastic element is arranged between the second pivot element and one of the lateral walls.

5. The lamp of claim 4, wherein the main body further includes a spring, the second toothed portion is formed on the base plate, the spring is arranged between the base plate and the shell to push the second toothed portion so that the second toothed portion tends to engaged with the first toothed portion.

6. The lamp of claim 1, wherein the first pivot axis is perpendicular to the second pivot axis.

7. The lamp of claim 1, wherein the seat is adapted for being detachably installed onto the roof of the vehicle, the seat has a detachable adhesive layer on a face thereof facing the roof of the vehicle.

* * * * *